United States Patent
Taranta et al.

(10) Patent No.: US 12,298,580 B2
(45) Date of Patent: May 13, 2025

(54) TECHNIQUES FOR AZIMUTHALLY ALIGNING A CROSS-SECTION OF AN ANTI-RESONANT HOLLOW CORE FIBER WHEN WINDING SUCH FIBER INTO A COIL

(71) Applicant: Honeywell International Inc., Charlotte, NC (US)

(72) Inventors: Austin Acker Taranta, Southampton (GB); Leonard George Budd, Southampton (GB); Francesco Poletti, Southampton (GB); Eric Numkam Fokoua, Southampton (GB); Seyed Mohammad Abokhamis Mousavi, Portsmouth (GB)

(73) Assignee: Honeywell International Inc., Charlotte, NC (US)

( * ) Notice: Subject to any disclaimer, the term of this patent is extended or adjusted under 35 U.S.C. 154(b) by 145 days.

(21) Appl. No.: 18/340,713

(22) Filed: Jun. 23, 2023

(65) Prior Publication Data
US 2024/0280776 A1    Aug. 22, 2024

Related U.S. Application Data

(60) Provisional application No. 63/447,209, filed on Feb. 21, 2023.

(51) Int. Cl.
*G02B 6/44* (2006.01)
*G01M 11/00* (2006.01)
*G02B 6/02* (2006.01)

(52) U.S. Cl.
CPC ............. *G02B 6/444* (2013.01); *G01M 11/37* (2013.01); *G02B 6/02361* (2013.01); *G02B 6/02328* (2013.01); *G02B 6/02357* (2013.01); *G02B 6/4457* (2013.01)

(58) Field of Classification Search
CPC ............ G02B 6/02328; G02B 6/02357; G02B 6/02361; G02B 6/444; G02B 6/4457; G01M 11/37
See application file for complete search history.

(56) References Cited

U.S. PATENT DOCUMENTS

| | | |
|---|---|---|
| 4,856,900 A | 8/1989 | Ivancevic |
| 4,928,904 A | 5/1990 | Watts |
| 5,263,112 A | 11/1993 | Holt |

(Continued)

FOREIGN PATENT DOCUMENTS

| | | |
|---|---|---|
| CN | 108088466 A | 5/2018 |
| CN | 108675045 A | 10/2018 |

(Continued)

OTHER PUBLICATIONS

Bradley et al., "Antiresonant Hollow Core Fibre with 0.65 dB/km Attenuation across the C and L Telecommunication Bands", ECOC 2019, 44th European Conference on Optical Communication, Sep. 22-26, 2019, Dublin, Ireland, PD.3.1., pp. 1 through 4.

(Continued)

*Primary Examiner* — Daniel Petkovsek
(74) *Attorney, Agent, or Firm* — Fogg & Powers LLC

(57) ABSTRACT

Techniques are provided for controlling azimuthal alignment of a cross-section of the anti-resonant hollow core fiber when winding such anti-resonant hollow core fiber into a coil.

20 Claims, 6 Drawing Sheets

(56) References Cited

U.S. PATENT DOCUMENTS

| | | | |
|---|---|---|---|
| 5,452,394 | A | 9/1995 | Huang |
| 9,568,318 | B2 | 2/2017 | Taranta |
| 11,248,931 | B2 | 2/2022 | Nakase et al. |
| 2004/0062515 | A1 | 4/2004 | Garner et al. |
| 2004/0155140 | A1 | 8/2004 | Mast et al. |
| 2006/0133751 | A1 | 6/2006 | Chen et al. |
| 2009/0052829 | A1 | 2/2009 | Terrel et al. |
| 2011/0081481 | A1 | 4/2011 | Hayashi |
| 2016/0206396 | A1 | 7/2016 | Noonan et al. |
| 2019/0234727 | A1* | 8/2019 | Roye ................ B25J 18/00 |
| 2020/0156987 | A1 | 5/2020 | Wheeler et al. |
| 2020/0278491 | A1* | 9/2020 | Poletti ............. G02B 6/02357 |

FOREIGN PATENT DOCUMENTS

| | | |
|---|---|---|
| CN | 109883587 B | 5/2021 |
| CN | 114754799 A | 7/2022 |
| EP | 0337250 A1 | 10/1989 |
| JP | 11037764 | 7/1997 |
| JP | 2011084414 A | 4/2011 |
| WO | 2022254986 A1 | 12/2022 |

OTHER PUBLICATIONS

Budd et al., "Non-Destructive Structural Characterisation of Double Nested Antiresonant Nodeless Fiber", Advanced Photonics Congress, in 2022 Optica Advanced Photonics Congress, Specialty Optical Fibres, Paper SoTH3G, pp. 1 through 2.

Budd et al., "Non-Invasive Measurement of Hollow-Core Antiresonant Fiber Structure", in 2021 IEEE Photonics Conference (IPC), Oct. 2021, pp. 1 through 2.

Carter et al., "Measurement of resonant bend loss in anit-resonant hollow core optical fiber", Optics Express, vol. 25, No. 17, Aug. 21, 2017, pp. 20612 through 20621.

Frosz et al., "Non-Invasive real-time characterization of hollow-core photonic crystal fibers using whispering gallery mode spectroscopy", Optics Express, vol. 27, No. 21, Oct. 14, 2019, pp. 30842 through 30851.

Gao et al., "Bending loss characterization in nodeless hollow-core anti-resonant fiber", Optics Express, vol. 24, No. 13, Jun. 22, 2016, pp. 14801 through 14811.

Jasion et al., "0.174 dB/km Hollow Core Double Nested Antiresonant Nodeless Fiber (DNANF)", in Optical Fiber Communication Conference (OFC), 2022, Technical Digest Series (Optica Publishing Group, 2022), paper Th4C.7, pp. 1 through 3.

Kurbatov et al., "Temperature Characteristics of Fiber-Optic Gyroscope Sensing Coils", Journal of Communication Technology and Electronics, 2013, vol. 58, No. 7, pp. 745 through 752.

Pennetta et al., "Fabrication and non-destructive characterization of tapered single-ring hollow-core photonic crystal fiber", APL Photonics, 4,056105 (2019), May 24, 2019, pp. Cover through 4,056105-6.

Poletti, "Nested antiresonant nodeless hollow core fiber", Optics Express, Sep. 22, 2014, vol. 22, No. 20, pp. 23807 through 23828.

Sakr et al., "Hollow Core NANFs with Five Nested Tubes and Record Low Loss at 850, 1060, 1300 and 1625nm", OFC 2021, F3A.4, downloaded Oct. 14, 2021 from IEEE Xplore, pp. 1 through 3.

Sakr et al., "Hollow core optical fibres with comparable attenuation to silica fibres between 600 and 1100 nm", Nature Communications, (2020) 11:6030, downloaded Jan. 18, 2023 from https://doi.org/10.1038/s41467-020-19910-7, www.nature.com/naturecommunications.

Stefani et al., "Real-time Doppler-assisted tomography of microstructured fibers by side-scattering", Optics Express, vol. 22, No. 21, Oct. 13, 2014, pp. 25570 through 25579.

Taranta et al., "Exceptional polarization purity in antiresonant hollow-core optical fibres", Nature Photonics, Aug. 2020, vol. 14, No. 8, pp. 504 through 510.

Taranta et al., "Supplementary Information, Exceptional polarization purity in antiresonant hollow-core optical fibres", Nature Photonics, Aug. 2020, vol. 14, No. 8, pp. Cover and 504 through 510.

Tentori et al., "Jones birefringence in twisted single-mode optical fibers", Optics Express, Dec. 16, 2013, vol. 21, No. 26, pp. 31725 through 31739.

University of Southampton, "Method and apparatus for controlled angle winding of nodeless antiresonant hollow core fibre", Invention Information Form (IIF), RIS reference: 20218, Jan. 12, 2023, pp. 1 through 16.

Wei et al., "Bending-induced mode non-degeneracy and coupling in chalcogenide negative curvature fibers", Optics Express, vol. 24, No. 11 May 26, 2016, pp. 12228 through 12239.

Xiong et al., "Four-ray interference model for complete characterization of tubular anti-resonant hollow core fibers", Optics Express, vol. 30, No. 26, Dec. 19, 2022, pp. 48061 through 48074.

Budd et al. "Longitudinal Non-Destructive Characterization of Nested Antiresonant Nodeless Fiber Microstructure Geometry and Twist", 2023 Optical Fiber Communications Conference and Exhibition (OFC), OSA, Mar. 5, 2023, pp. 1 through 3.

Budd et al. "Non-Destructive Structural Characterisation of Double Nested Antiresonant Nodeless Fiber", Optical Devices and Materials for Solar Energy and Solid-State Lighting 2022, Jan. 1, 2022, pp. SoTh3G.1 through SoTh3G.1.

Budd et al. "Non-Invasive Measurement of Hollow-Core Antiresonant Fiber Structure", 2021 IEEE Photonics Conference (IPC), IEEE, Oct. 18, 2021, pp. 1 through 2.

European Patent Office, "Extended European Search Report", dated May 23, 2024, from EP Application No. 23213130.0, from Foreign Counterpart to U.S. Appl. No. 18/340,713, pp. 1 through 10, Published: EP.

Frosz et al. "Non-invasive real-time characterization of hollow-core photonic crystal fibers using whispering gallery mode spectroscopy", Optics Express, vol. 27, No. 21, Oct. 10, 2019, pp. 30842 through 30851.

\* cited by examiner

TECHNIQUES FOR AZIMUTHALLY ALIGNING A CROSS-SECTION OF AN ANTI-RESONANT HOLLOW CORE FIBER WHEN WINDING SUCH FIBER INTO A COIL

STATEMENT REGARDING FEDERALLY SPONSORED RESEARCH OR DEVELOPMENT

This invention was made with Government support under Contract No. FA9453-20-C-0013 awarded by the Air Force Research Laboratory. The Government has certain rights in the invention.

BACKGROUND

In comparison to solid core optical fibers, hollow core optical fibers (or hollow core fibers) may exhibit lower propagation loss and non-linearities. One type of hollow core fiber is an anti-resonant hollow core fiber. The anti-resonant hollow core fiber, including a nested anti-resonant hollow core fiber, has lower loss than other hollow fibers. Anti-resonant hollow core fibers are further described in Francesco Poletti, "Nested antiresonant nodeless hollow core fiber," Opt. Express 22, 23807-23828 (2014), which is incorporated by reference herein in its entirety. An unwound length of an optical fiber may be wound into a coil. A coil of optical fiber may be used in a sensor, e.g., an optical fiber gyroscope or a gas sensor, or for non-linear optic applications. A coil of appropriately designed anti-resonant hollow core fiber theoretically exhibits lower loss and non-linearities. Thus, for example, a measurement system implemented with the coil of anti-resonant hollow core fiber theoretically exhibits higher measurement sensitivity.

However, when optical fiber is wound on a spool to be dispensed to form such a coil, an azimuthal angle of a cross-section of the optical fiber varies, e.g., randomly, as a length of the fiber is wound into the coil. Cross-sections of an anti-resonant hollow core fiber, and of microstructures comprising the fiber, typically have different azimuthal rotations with respect to one another. Such variation in azimuthal angle of such cross-sections undesirably results in higher propagation loss in the coil formed from anti-resonant hollow core fiber.

SUMMARY

A method of operating a system is provided for azimuthally aligning a hollow core optical fiber being wound around a winding axis into a coil. The method comprises: projecting an optical signal on an outer surface of a jacket of an unwound anti-resonant hollow core fiber; measuring, at each of two optical detectors, power or energy levels of portions, of the optical signal, reflected from and/or traversing around a circumference of at least one capillary of the unwound anti-resonant hollow core fiber, wherein the two optical detectors are separated from one another by an azimuthal offset angle with respect to a cross-section of the unwound anti-resonant hollow core fiber; receiving, from each optical detector, data about the measured power or energy levels; using (a) the data about the measured power or energy levels received from each optical detector and (b) at least one of (i) a desired azimuthal orientation of the cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber; using the azimuthal correction data, adjusting an azimuthal alignment of the cross-section or another cross-section of the unwound anti-resonant hollow core fiber with respect to the bend plane; and winding the coil of the optical fiber using the unwound anti-resonant hollow core fiber whose azimuthal alignment has been adjusted.

A program product is provided and comprises a non-transitory processor readable medium on which program instructions are embodied, wherein the program instructions are configured, when executed by at least one programmable processor, to cause the at least one programmable processor to execute a process to cause a hollow core optical fiber to be azimuthally aligned when being wound around a winding axis into a coil. The process comprises: receiving, from each of two optical detectors, data about power or energy levels measured at each of the two optical detectors, wherein the two optical detectors are separated from one another by an azimuthal offset angle with respect to a cross-section of an unwound anti-resonant hollow core fiber; using (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber; and transmitting the azimuthal correction data which is configured to be used to adjust an azimuthal alignment of the cross-section or another cross-section of the unwound anti-resonant hollow core fiber with respect to the bend plane as a coil of optical fiber is wound using the unwound anti-resonant hollow core fiber whose azimuthal alignment has been adjusted.

An apparatus is provided and is configure to azimuthally align a cross-section of unwound anti-resonant hollow core fiber when winding such unwound anti-resonant hollow core fiber into a coil. The apparatus comprises: a source of the unwound anti-resonant hollow core fiber, wherein the unwound anti-resonant hollow core fiber comprises at least one set of anti-resonant capillary elements and a jacket, wherein the at least one set of anti-resonant capillary elements is affixed to an interior sidewall of the jacket; a sensor configured to determine an azimuthal rotation offset of the unwound anti-resonant hollow core fiber, wherein the sensor comprises at least one optical source and at least two optical detectors, wherein each optical source is configured to generate an optical signal, wherein each optical signal is configured to be incident on an exterior surface of a jacket of the unwound anti-resonant hollow core fiber, wherein each detector is separated from another detector by an azimuthal offset angle with respect to a cross-section of the unwound anti-resonant hollow core fiber, wherein the cross-section is perpendicular to a length of the unwound anti-resonant hollow core fiber, wherein each detector is configured to measure power or energy levels of portions, of the optical signal, reflected from and/or traversing around a circumference of at least one capillary of the unwound anti-resonant hollow core fiber; processing circuitry communicatively coupled to the sensor and configured to receive data about the power or the energy levels measured by each detector; wherein the processing circuitry is further configured to use (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identify, for each of such data received from an optical detector, a maximum intensity with respect to optical path delay or a time delay at which the maximum intensity occurs with respect to the optical path delay and then using each maximum intensity or time delay, (y) determine azimuthal correction data, wherein the cross-section is perpendicular to a length of the unwound anti-resonant hollow core fiber; a mandrel comprising a winding axis and configured to wind, into the coil, the unwound anti-resonant hollow core fiber dispensed from the source of the unwound anti-resonant hollow core fiber; and a rotation mechanism comprising a motor and configured, responsive to the azimuthal correction data, to azimuthally rotate the cross-section or another cross-section of the unwound anti-resonant hollow core fiber to control azimuthal rotation of the unwound anti-resonant hollow core fiber, relative to a bend plane of the unwound anti-resonant hollow core fiber, as the coil is wound on the mandrel, wherein the bend plane is orthogonal to the cross-section of the unwound anti-resonant hollow core fiber and is orthogonal to the winding axis of the mandrel.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
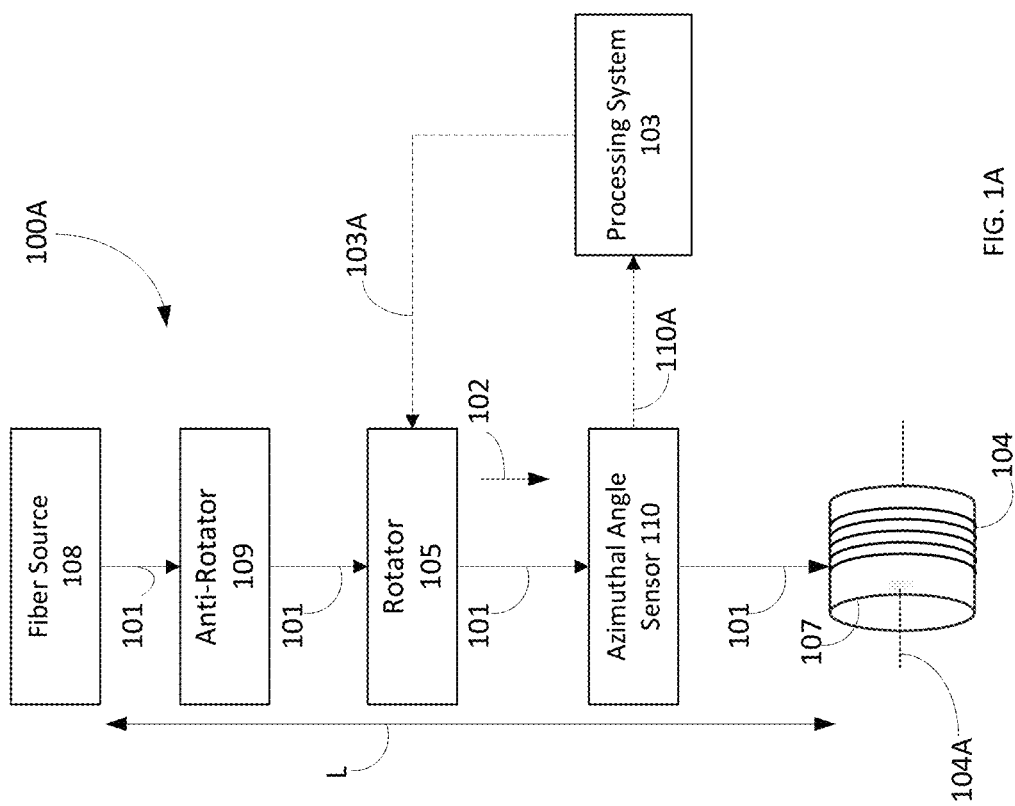
FIG. 1A illustrates a block diagram of one embodiment of a winding system configured to control azimuthal alignment (with respect to an axis parallel to a length of an anti-resonant hollow core fiber) of a cross-section of the anti-resonant hollow core fiber when winding such anti-resonant hollow core fiber into a coil.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

For pedagogical purposes, embodiments of the invention are illustrated with respect to anti-resonant hollow core fiber. However, embodiments of the invention are more generally applicable to other types of hollow core optical fibers.

Techniques are provided for controlling azimuthal alignment (with respect to an axis along a length of an anti-resonant hollow core fiber) of a cross-section of the anti-resonant hollow core fiber when winding such anti-resonant hollow core fiber into a coil. Optionally, such techniques may be used to substantially diminish differences between azimuthal rotations of cross-sections of the anti-resonant hollow core fiber, about a fiber transmission axis[1], in parallel planes. Optionally and alternatively, such techniques can be used to induce a predetermined rate of azimuthal rotation of the anti-resonant hollow core fiber when the anti-resonant hollow core fiber is wound as a coil; optionally, this may be done to diminish polarization mode dispersion or to introduce circular polarization in lieu of linear polarization. The predetermined rate of azimuthal rotation may be a constant amount, e.g., zero, or a variable one, e.g., a continuously varying rotation rate, for example that is sinusoidally varying.

[1] The fiber transmission axis is an axis through an optical fiber along a length L of the optical fiber and, e.g., parallel to axis 102.

Figure 1B:
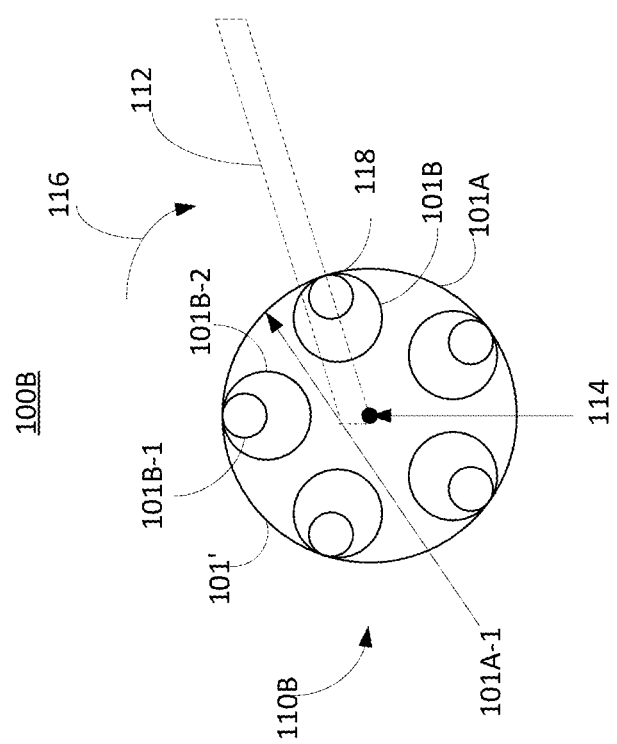
FIG. 1B illustrates a cross-section of one embodiment of an anti-resonant hollow core fiber comprises at least one set of anti-resonant capillary elements and a jacket.

FIG. 1A illustrates a block diagram of one embodiment of a winding system 100A configured to control azimuthal alignment (with respect to an axis 102 parallel to a length L of unwound anti-resonant hollow core fiber[2] 101) of a cross-section of the unwound anti-resonant hollow core fiber 101 when winding such unwound anti-resonant hollow core fiber 101 into a coil 104. FIG. 1B illustrates a cross-section 100B of one embodiment of an anti-resonant hollow core fiber 101' comprises at least one set 101B of anti-resonant capillary elements (or capillaries) and a jacket 101A. Each set 101B of anti-resonant capillary elements comprises one or more capillary elements 101B-1, 101B-2; if a set 101B of anti-resonant capillary elements comprises two or more capillary elements 101B-1, 101B-2, each such capillary element is nested within another capillary element of the set 101B. The jacket 101A and each capillary element are hollow tubes, e.g., with a circular or non-circular cross-section; optionally, the jacket 101A and each capillary element is formed from glass.

[2] Wound anti-resonant hollow core fiber means the fiber wound to form a coil. Unwound anti-resonant hollow core fiber means anti-resonant hollow core fiber which has not been wound into a coil.

Optionally, each set 101B of anti-resonant capillary elements is equidistantly spaced around an interior sidewall (or surface) 101A-1 of the jacket 101A; for pedagogical purposes, FIG. 1B illustrates such a disposition. However, in other embodiments, each set 101B of anti-resonant capillary elements is not equidistantly spaced around an interior sidewall 101A-1 of the jacket 101A. Each set 101B of anti-resonant capillary elements is affixed to an interior sidewall 101A-1 of the jacket 101A. Optionally, each capillary element of each set 101B of capillary elements contacts (or is attached to) the interior sidewall 101A-1 of the jacket 101A. Optionally, the axis 102 parallel to the length L of the unwound anti-resonant hollow core fiber 101 passes through a center 114 of the cross-section of the unwound anti-resonant hollow core fiber 101. Optionally, the length L of the unwound anti-resonant hollow core fiber 101 propagates along the center 114 of the cross-section through the unwound anti-resonant hollow core fiber 101.

The unwound anti-resonant hollow core fiber 101 is configured to be wound in a coil 104, around a mandrel 107, relative to a bend plane 112 of the unwound anti-resonant hollow core fiber 101. The coil 104 includes a winding axis 104A around which the coil 104 is wound. The bend plane 112 is orthogonal both to the winding axis 104A and to the cross-section 100B of the unwound anti-resonant hollow core fiber 101.

An azimuthal orientation (or azimuthal angle) 116 of the cross-section 100B with respect to the bend plane 112 may be fixed or varying with respect to the axis 102 parallel to the length L of the unwound anti-resonant hollow core fiber 101 as the unwound anti-resonant hollow core fiber 101 is wound into the coil 104. Optionally, if the azimuthal orientation 116 of the cross-section 100B with respect to the bend plane 112 is fixed, then an intersection of the bend plane 112 with a region 118 of, e.g., a line in, the jacket 101A must be selected. Such a region 118 of the jacket 101A may be where one set of anti-resonant capillary elements contacts (or is attached to) the jacket 101A or a region between two sets of anti-resonant capillary elements. For pedagogical reasons, FIG. 1B illustrates that the bend plane 112 intersects with a region 118 of the jacket 101A where the set of anti-resonant capillary elements contacts (or is attached to) the inner sidewall 101A-1 of the jacket 101A. Each cross-section 100B is perpendicular to the length L of the unwound anti-resonant hollow core fiber 101.

Returning to FIG. 1A, the winding system 100A includes a source (or fiber source) 108 of the unwound anti-resonant hollow core fiber 101. The fiber source 108 is configured to dispense the unwound anti-resonant hollow core fiber 101 to be wound into a coil 104. Optionally, the fiber source 108 may be a spool of wound anti-resonant hollow core fiber, a machine used to manufacture the unwound anti-resonant hollow core fiber 101, or any other source of the unwound anti-resonant hollow core fiber 101.

The winding system 100A further includes a rotator 105 configured to rotate the azimuthal orientation 116, of the cross-section 100B of the unwound anti-resonant hollow core fiber 101, with respect to an axis 102 along a length L of an unwound anti-resonant hollow core fiber 101. Optionally, the rotator 105 may be a twist gimbal or a pair of pinch rollers. When the twist gimbal is used as the rotator 105, then optionally the fiber source 108 is mounted on the twist gimbal. Optionally, when the pair of pinch rollers are used as the rotator 105, one or more springs may be used to generate a tight fit between the pair of pinch rollers. The rotator 105 may be rotated (e.g., by an electric motor, a human being, or another means) by an azimuthal angle with respect to an axis 102 along a length L of the unwound anti-resonant hollow core fiber 101) of the unwound anti-resonant hollow core fiber 101.

The winding system 100A optionally includes anti-rotator 109 configured to prevent azimuthal rotation (caused by the rotator 105) from being imparted to the unwound anti-resonant hollow core fiber 101 being dispensed from the fiber source 108. The anti-rotator 109 comprises a moveable portion and another portion (moveable or fixed). The two portions are compressed, e.g., by spring(s), against one another so that friction prevents imparting the azimuthal rotation to the unwound anti-resonant hollow core fiber 101 being dispensed from the fiber source 108. Optionally, the anti-rotator 109 may be implemented with two pairs of pinch rollers, a pinch roller and a fixed or rotatable capstan shaft, or another type of mechanism which prevents such propagation of the azimuthal rotation to the unwound anti-resonant hollow core fiber 101 being dispensed from the fiber source 108. Optionally, for each such mechanism, one or more springs may be used to generate a tight fit between the pair of pinch rollers, the pinch roller and a capstan shaft, etc. to prevent such propagation of azimuthal rotation.

The winding system 100A further includes an azimuthal angle sensor 110 optically coupled to the unwound anti-resonant hollow core fiber 101. The azimuthal angle sensor 110 is configured to (a) project an optical signal on the unwound anti-resonant hollow core fiber 101. (b) measure power or energy levels, e.g., with respect to frequency spectrum, of portions, of the optical signal, reflected from and/or traversing the circumference of capillaries, and (c) transmit data 110A about such incident power or energy levels to a processing system 103. Optionally, the azimuthal angle sensor 110 makes such measurements continuously as the unwound anti-resonant hollow core fiber 101 is wound into the coil 104.

The azimuthal angle sensor 110 may precede or follow the rotator 105. For example, if a continuous rate of rotation of the cross-section 110B of the unwound anti-resonant hollow core fiber 101 is desired, then optionally the rotator 105 would follow the azimuthal angle sensor 110.

The winding system 100A also includes the processing system (or processing circuitry) 103 configured to receive the data 110A about the power or energy levels (measured by the azimuthal angle sensor 110), and to determine an azimuthal orientation of the cross-section 110B of the unwound anti-resonant hollow core fiber 101 with respect to the azimuthal angle sensor 110. Optionally, the processing system 103 is configured to receive (from another system or from user input) (a) an initial azimuthal orientation of the cross-section 110B of the unwound anti-resonant hollow core fiber 101 with respect to a bend plane 112 and/or (b) a desired rate of azimuthal rotation with respect to length L of the unwound anti-resonant hollow core fiber 101. Using the data 110A received from the azimuthal angle sensor 110 (and optionally the initial azimuthal orientation of the cross-section 110B and/or the desired rate of azimuthal rotation with respect to length L of the unwound anti-resonant hollow core fiber 101), the processing system 103 generates azimuthal correction data 103A transmitted to the rotator 105. The rotator 105 is configured to use the azimuthal correction data 103A to rotate the azimuthal orientation of the cross-section 110B of the unwound anti-resonant hollow core fiber 101 relative to a bend plane 112 of the unwound anti-resonant hollow core fiber 101 as the coil 104 is wound.

Figure 2A:
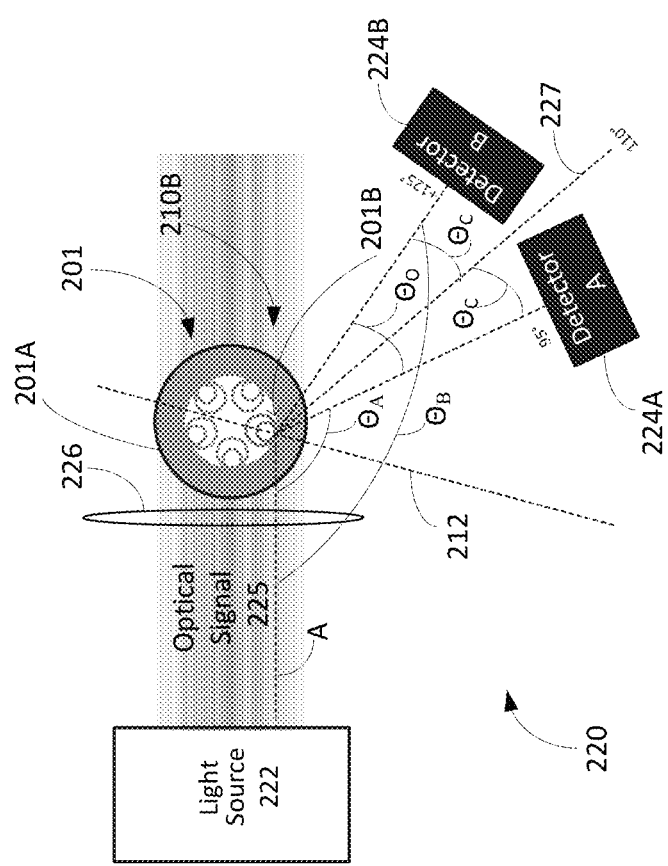
FIG. 2A illustrates a block diagram of one embodiment of the azimuthal angle sensor.

FIG. 2A illustrates a block diagram of one embodiment of the azimuthal angle sensor 220. The azimuthal angle sensor 220 includes at least one optical source and at least two optical detectors. Optionally, each optical source emits a broadband spectrum, e.g., a white spectrum, near infrared spectrum, or a spectrum ranging from infrared to ultraviolet, or another spectrum. Each optical detector provides an electrical signal whose amplitude is proportional to an amount of incident optical energy. Optionally, each optical detector includes a spectrometer (or an optical spectrum analyzer) configured to provide incident optical power with respect to frequency; however, each optical detector may be an alternative type of optical detector such as a Michelson interferometer.

For pedagogical purposes, the illustrated azimuthal angle sensor 220 includes an optical source (or light source) 222 and two optical detectors 224A, 224B (i.e., a first optical detector (detector A) 224A and a second optical detector (detector B) 224B). Each optical detector is configured to collect scattered light and disposed at a different azimuthal angle with respect to an axis A parallel to an optical signal 225 (emitted from an optical (or light) source 222); this facilitates characterization of azimuthal orientation (of the cross-section 210B of the unwound anti-resonant hollow core fiber 201) with respect to the axis 102 along the length of the unwound anti-resonant hollow core fiber 201. In the embodiment illustrated in FIG. 2A, a first azimuthal angle $\Theta_A$ with respect to the axis A parallel to the optical signal 225 and the detector A 224A is, for example, 95 degrees, and the second azimuthal angle $\Theta_B$ with respect to the axis A parallel to the optical signal 225 and the detector A 224B is 125 degrees. An azimuthal offset angle $\Theta_O$ is a magnitude of a difference between the first azimuthal angle $\Theta_A$ and the second azimuthal angle $\Theta_B$. An azimuthal angular center 227 is midway between the two optical detectors 224A, 224B and is at a center azimuthal angle $\Theta_C$. e.g., 15 degrees, which is one half of the sum of $\Theta_A$ and $\Theta_B$ and is one half of $\Theta_C$.

The optical source 222 is configured to generate an optical signal 225 projected on an exterior surface (or sidewall) 201O of the jacket 201A of the unwound anti-resonant hollow core fiber 201. The exterior surface 201O is parallel to the length L of the unwound anti-resonant hollow core fiber 201. The azimuthal angle sensor 220 optionally includes an optical lens 226 configured to collimate the optical signal 225 so that more optical energy from the optical signal 225 is incident upon the jacket 201A of the unwound anti-resonant hollow core fiber 201. For pedagogical purposes, the bend plane 212 is illustrated bisecting one set of anti-resonant capillaries 201B.

Figure 2B:
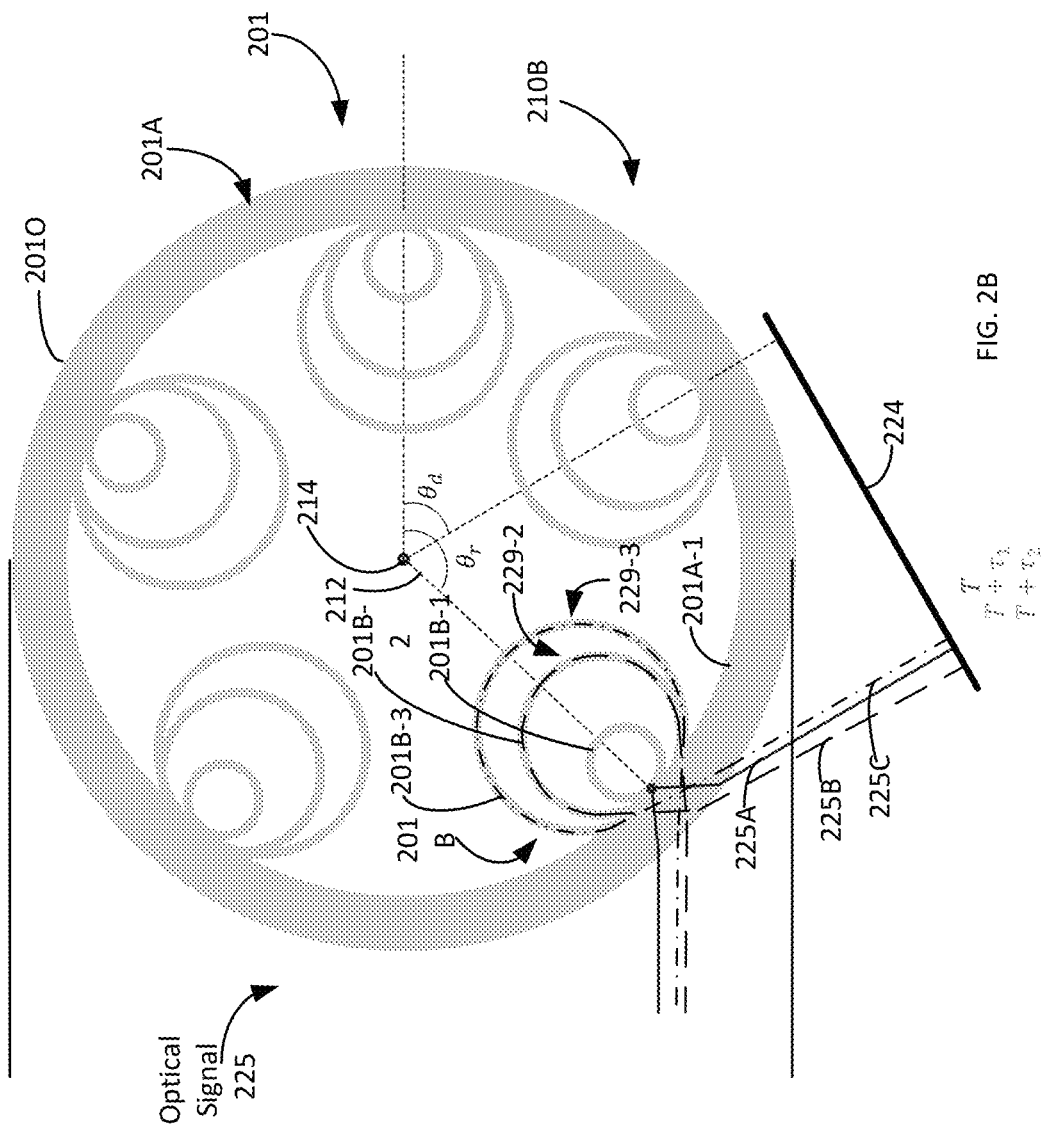
FIG. 2B illustrates one embodiment of a diagram of a cross section of an unwound anti-resonant hollow core fiber upon which an optical signal is incident.

FIG. 2B illustrates one embodiment of a diagram of a cross-section 210B of an unwound anti-resonant hollow core fiber 201 upon which an optical signal 225 is incident. FIG. 2B illustrates the center 214 of the cross-section 210B of the unwound anti-resonant hollow core fiber 201.

For pedagogical purposes, FIG. 2B illustrates how portions 225A, 225B, 225C of the optical signal 225 are either reflected from and traverse around different capillaries of one set of anti-resonant capillaries 201B. In practice, other portions of the optical signal 225 would be reflected from and traverse around different capillaries of each set of anti-resonant capillaries of the unwound anti-resonant hollow core fiber 201. For pedagogical purposes, the unwound anti-resonant hollow core fiber 201 is illustrated with a set of anti-resonant capillaries 201B comprising three nested anti-resonant capillaries 201B-1, 201B-2, 201B-3. Before being received by an optical detector 224, a first portion 225A of the optical signal 225 is reflected where the first capillary 201B-1 contacts or joins, e.g., the inner surface 201A-1 of, the jacket 201A. A second portion 225B of the optical signal 225 traverses around a wall 229-2 of the second capillary 201B-2 before being received by the optical detector 224. A third portion 225C of the optical signal 225 traverses around a wall 229-3 of the third capillary 201B-3 before being received by the optical detector 224. The propagation distance of the first portion 225A is less than the propagation distance of the second portion 225B (because the second portion 225B traverses around the wall 229-2 of the second capillary 201B-2 and the first portion 225A does not traverse around a wall of a capillary). The propagation distance of the second portion 225B is less than the propagation distance of the third portion 225C because the circumference of the second capillary 201B-2 is less than the circumference of the third capillary 201B-3 travelled by the third portion 225C. Thus, the first portion 225A first arrives at the optical detector 224 at time T, the second portion 225B first arrives at the optical detector 224 at time $T+\tau_1$, and the third portion 225C arrives at the optical detector 224 at time $T+\tau_2$. $\tau_1$ is a difference in times between first arrival (at the optical detector 224) of the second portion 225B and the first portion 225A. $\tau_2$ is a difference in times of first arrival (at the optical detector 224) between third portion 225C and the first portion 225A. $\tau_2-\tau_1$ is a difference in times of first arrival (at the optical detector 224) between the third portion 225C and the second portion 225B. Data 110A about the power or energy levels incident upon each optical detector 224A, 224B is electrically coupled to a processing system 103.

Figure 3A:
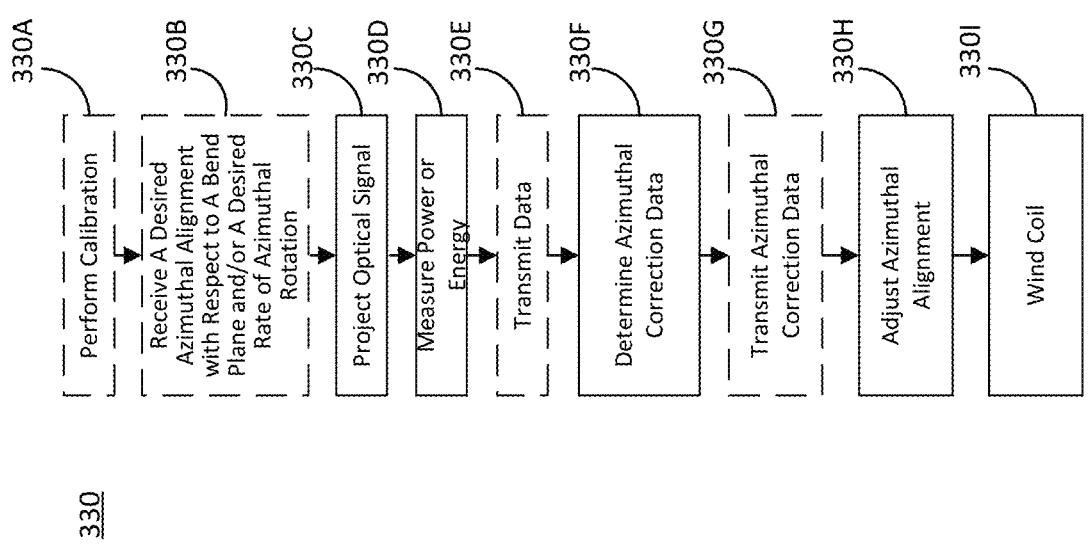
FIG. 3A illustrates a flow diagram of one embodiment of a method of operation of a system for winding a coil of optical fiber.

FIG. 3A illustrates a flow diagram of one embodiment of a method 330 of operation of a system for winding a coil of optical fiber. Optionally, the optical fiber is anti-resonant hollow core optical fiber. To the extent that the methods shown in any Figures are described herein as being implemented with any of the techniques illustrated herein, it is to be understood that other embodiments can be implemented in other ways. Optionally, method 330 may be implemented by the winding system 100A, the unwound anti-resonant hollow core fiber 101, and techniques described herein; however, embodiments of the invention may be applicable to other winding systems, other types of fiber, and/or other techniques. The blocks of the flow diagrams have been arranged in a generally sequential manner for case of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 330A, the winding system 100A is calibrated so that the at least two optical detectors 224A, 224B are aligned with respect to a set of capillaries or a space between two sets of capillaries. Optionally, calibration entails azimuthally rotating a cross-section 110B until a set of capillaries or space is detected and aligning respectively the at least two optical detectors or the space so that respectively the set of capillaries or the space is centered, i.e., that each of two optical detectors receives an equal amount of incident optical power within a temporal region representative of the set of capillaries. The temporal region representative of a set of capillaries means a region of energy or power whose temporal delay is equivalent to a physical dimension, e.g., a circumference, of the set of capillaries; optionally, the physical dimension may be (a) a circumference of a largest or a smallest capillary of the set or (b) a difference in circumferences of two capillaries of the set. Optionally, in block 330B, a desired azimuthal orientation of a cross-section 110B with respect to a bend plane 112, 212 and/or a desired rate of azimuthal rotation of the cross-section 110B with respect to length of the unwound anti-resonant hollow core fiber 101 is received, e.g., by the processing system 103. Optionally, the initial azimuthal orientation with respect to a bend plane 112, 212 may have the bend plane 212 bisecting a cross-section of one set of anti-resonant capillaries 201B; alternatively, the initial azimuthal orientation can be anywhere between lines bisecting cross-sections of two adjacent sets of anti-resonant capillary elements. Alternatively, one or both of the aforementioned types of data may be previously stored, in the processing system 103, by a user or designer of the winding system 100A.

In block 330C, an optical signal 225 is projected on an exterior surface 201O of the jacket 201A of the unwound anti-resonant hollow core fiber 101. The exterior surface 201O is parallel with the length L of the unwound anti-resonant hollow core fiber 101. Optionally, block 330C (optical signal projection on the unwound anti-resonant hollow core fiber 101 is performed additionally or alternatively prior to or as part of block 330A (calibration).

In block 330D, power or energy levels, e.g., with respect to frequency spectrum, of portions, of the optical signal 225, reflected from and/or traversing around the circumference of at least one capillary of the unwound anti-resonant hollow core fiber 101 are measured, e.g., with the azimuthal angle sensor 110. Optionally, the azimuthal angle sensor 110 comprises at least two optical detectors 224A, 224B each of which detects such power or energy level incident on it; each pair of optical detectors 224A, 224B are separated by an offset azimuthal angle. In optional block 330E, data 110A about the measured power or energy levels is transmitted, e.g., to and received by the processing system 103.

In block 330F, using (a) the data 110A about the measured power or energy levels and (b) at least one of (i) the desired azimuthal orientation of the cross section with respect to the bend plane and (ii) the desired rate of azimuthal rotation with respect to the length of the unwound anti-resonant hollow core fiber 101, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data. Optionally, the identifying and determining are performed using the processing system 103. The cross-section is perpendicular to a length of the unwound anti-resonant hollow core fiber.

Such azimuthal correction data is configured to be used to change or adjust an azimuthal alignment or orientation of the cross-section 110B with respect to the bend plane 112. Optionally, the azimuthal correction data may correspond to a change or adjustment to initially set a desired azimuthal alignment of the cross-section with respect to the bend plane, e.g., to correct for azimuthal rotation of the cross-section induced by the fiber source 108, and/or to affect the desired rate of azimuthal rotation of the cross-section 110B with respect to the length of the unwound anti-resonant hollow core fiber 101. In optional block 330G, azimuthal correction data 103A representing the change to the azimuthal alignment of the cross-section 110B with respect to the bend plane 112 is transmitted, e.g., from the processing system 103 to the rotator 105 which receives such azimuthal correction data 103A.

In block 330H, using the azimuthal correction data 103A, the azimuthal alignment of the cross-section 110B or another cross-section with respect to the bend plane 112 is adjusted, e.g., by the rotator 105. Optionally, such adjustment causes a continuous azimuthal rotation or a periodically varying azimuthal rotation of the cross-section of the unwound anti-resonant hollow core fiber 101. In block 330I, a coil is, e.g., partially, wound, e.g., on a mandrel 107.

Figure 3B:
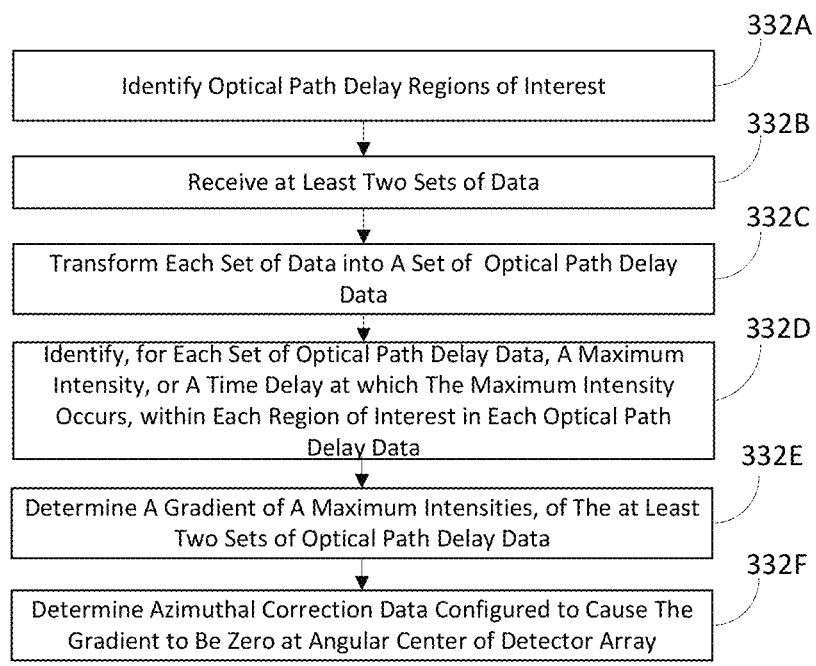
FIG. 3B illustrates a flow diagram of one embodiment of a method of determining a change or adjustment to an azimuthal alignment of the cross-section with respect to the bend plane.

FIG. 3B illustrates a flow diagram of one embodiment of a method 332 of determining a change or adjustment to an azimuthal alignment of the cross-section 110B with respect to the bend plane 112, e.g., block 330E. However, block 330E may be implemented in other ways. To the extent that the methods shown in any Figures are described herein as being implemented with any of the techniques illustrated herein, it is to be understood that other embodiments can be implemented in other ways. Optionally, method 332 may be implemented by the processing system 103; however, the method 332 may be implemented elsewhere, e.g., in a cloud computing system remotely located from the winding system 100A. The blocks of the flow diagrams have been arranged in a generally sequential manner for case of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 332A, optical path delay regions of interest (in a time domain) for the unwound anti-resonant hollow core fiber 101 (being wound) are identified. Optionally, an optical path delay region of interest is identified or determined for each of one or more capillary elements 101B-1, 101B-2 of a set of anti-resonant capillary elements 101B, e.g., each capillary element of the set. Based on a known diameter of each capillary element 101B-1, 101B-2 of a set of anti-resonant capillary elements 101B, and a known optical group velocity of an optical signal traveling around each circumference of at least one, e.g., each, capillary element 101B-1, 101B-2, a relative time delay of the optical signal travel around each circumference of at least one, e.g., each, capillary element 101B-1, 101B-2, with respect to optical signal travel reflected from a portion of the hollow core fiber, e.g., an inner surface 201A-1 of the jacket 201A of the unwound anti-resonant hollow core fiber 101, is determined. FIG. 2B illustrates a first portion 225A of an optical signal reflected from the inner surface 201A-1 of the jacket 201A. Each optical path delay region of interest is around, e.g., centered around a relative time delay of optical signal travel through a circumference of one capillary element 101B-1, 101B-2.

In block 332B, at least two sets of data is received, e.g., from each of at least two optical detectors 224A, 224B of the azimuthal angle sensor 110. Such each set of data includes detected optical power, e.g., incident on a unique optical detector (for example, a unique spectrometer) with respect to wavelength ("wavelength domain data") or with respect to frequency ("frequency domain data"), e.g., when each detector is a spectrometer. When a set of data includes wavelength domain data, then the wavelength domain data is transformed to frequency domain data ("wavelength domain to frequency domain transformed data"). Because a separation between elements of wavelength domain to frequency domain transformed data may not be equally spaced in a frequency domain, interpolation is optionally performed on the wavelength domain to frequency domain transformed data to obtain data including optical power incident on the spectrometer with respect to frequency and which is equally spaced in the frequency domain. This facilitates a more efficient performance of the inverse Fourier transform, e.g., an inverse discrete Fourier transform. Equally spaced in frequency domain means that each optical power incident on the spectrometer is separated by another optical power incident on the spectrometer by a constant amount of frequency in the frequency domain.

Alternatively, each of the optical detectors could be an interferometric detector, for example, a Michelson interferometer. In such a case, each set of data would be detected optical power, e.g., incident on a unique optical detector, with respect to phase delay between two arms of the interferometric detector or mirror displacement in the interferometric detector ("interferometric path delay data"). Phase delay data or mirror displacement data with respect to detected optical power (determined by the interferometric detector) is conveyed to the processing system.

In block 332C, each set of data including detected optical power with respect to frequency is transformed. Such transformation, when the optical detectors are spectrometers may be, e.g., with an inverse Fourier transform (for example, an inverse discrete Fourier transform (DFT)) configured to transform each set of data including detected optical power with respect to frequency spectrum into a set of data including detected optical power with respect to time ("time domain data" or "optical path delay data"). If each set of data is "interferometric path delay data", then such set of data is transformed to optical power with respect to time by converting phase delay or mirror displacement to an equivalent time delay.

In block 332D, for each set of optical path delay data, a maximum intensity, or a time delay at which the maximum intensity occurs, within a region of interest in a corresponding set of optical path delay data is identified. In block 332E, a gradient of the maximum intensities, or the time delays at which the maximum intensity occurs, is determined. Optionally, block 332E is implemented using each identified maximum intensity or time delay. In block 332F, azimuthal correction data configured to cause the gradient to be zero at an azimuthal angular center 227 between the two optical detectors 224A, 224B is determined. Optionally, block 332F may be implemented by a proportional integral derivative (PID) controller, e.g., in the processing system 103.

Methods of embodiments of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Exemplary Embodiments

Example 1 includes a method of operating a system for azimuthally aligning a hollow core optical fiber being wound around a winding axis into a coil, the method comprising: projecting an optical signal on an outer surface of a jacket of an unwound anti-resonant hollow core fiber; measuring, at each of two optical detectors, power or energy levels of portions, of the optical signal, reflected from and/or traversing around a circumference of at least one capillary of the unwound anti-resonant hollow core fiber, wherein the two optical detectors are separated from one another by an azimuthal offset angle with respect to a cross-section of the unwound anti-resonant hollow core fiber; receiving, from each optical detector, data about the measured power or energy levels; using (a) the data about the measured power or energy levels received from each optical detector and (b) at least one of (i) a desired azimuthal orientation of the cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber; using the azimuthal correction data, adjusting an azimuthal alignment of the cross-section or another cross-section of the unwound anti-resonant hollow core fiber with respect to the bend plane; and winding the coil of the optical fiber using the unwound anti-resonant hollow core fiber whose azimuthal alignment has been adjusted.

Example 2 includes the method of Example 1, wherein adjusting the azimuthal alignment of the cross-section or another cross-section of the unwound anti-resonant hollow core fiber comprises diminishing azimuthal rotations of cross-sections of the unwound anti-resonant hollow core fiber.

Example 3 includes the method of any of Examples 1-2, wherein adjusting the azimuthal alignment of the cross-section or the other cross-section comprises causing a continuous azimuthal rotation of the cross-section or the other cross-section of the unwound anti-resonant hollow core fiber or a periodically varying azimuthal rotation of the cross-section or the other cross-section of the unwound anti-resonant hollow core fiber.

Example 4 includes the method of any of Examples 1-3, further comprising calibrating the system by azimuthally rotating the cross-section or the other cross-section of the unwound anti-resonant hollow core fiber until a set of capillaries or space between two sets of capillaries is detected and aligning respectively the two optical detectors or the space so that each of the two optical detectors receives an equal amount of incident optical power within a temporal region representative of the set of capillaries.

Example 5 includes the method of any of Examples 1-4, further comprising receiving at least one of: the desired azimuthal orientation of the cross-section of the unwound anti-resonant hollow core fiber with respect to the bend plane and a desired rate of azimuthal rotation of the cross-section of the anti-resonant hollow core optical fiber with respect to the length of the unwound anti-resonant hollow core fiber.

Example 6 includes the method of any of Examples 1-5, wherein the optical signal comprises white light, near infrared light, or a spectrum ranging from infrared light to ultraviolet light, or another optical spectrum.

Example 7 includes the method of any of Examples 1-6, wherein measuring the power or energy levels comprises measuring the power or energy levels with respect to frequency spectrum.

Example 8 includes the method of any of Examples 1-7, wherein determining the azimuthal correction data comprises: identifying optical path delay regions of interest in the unwound anti-resonant hollow core fiber; receiving at least two sets of data each of which includes detected optical power with respect to wavelength, frequency, or interferometric delay, wherein each pair of sets of data is received from each of the two optical detectors; transforming each set of data including detected optical power into a set of data including optical path delay data; and for each set of optical path delay data, identifying the maximum intensity, or the time delay at which the maximum intensity occurs, within an optical path delay region of interest in a corresponding set of optical path delay data is identified; determining a gradient of respectively maximum intensities or time delays; and determining azimuthal correction data configured to cause the gradient to be zero at an azimuthal angular center between the two optical detectors.

Example 9 includes a program product comprising a non-transitory processor readable medium on which program instructions are embodied, wherein the program instructions are configured, when executed by at least one programmable processor, to cause the at least one programmable processor to execute a process to cause a hollow core optical fiber to be azimuthally aligned when being wound around a winding axis into a coil, the process comprising: receiving, from each of two optical detectors, data about power or energy levels measured at each of the two optical detectors, wherein the two optical detectors are separated from one another by an azimuthal offset angle with respect to a cross-section of an unwound anti-resonant hollow core fiber; using (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber; and transmitting the azimuthal correction data which is configured to be used to adjust an azimuthal alignment of the cross-section or another cross-section of the unwound anti-resonant hollow core fiber with respect to the bend plane as a coil of optical fiber is wound using the unwound anti-resonant hollow core fiber whose azimuthal alignment has been adjusted.

Example 10 includes the program product of Example 9, wherein the process further comprises causing azimuthal rotation of the cross-section or the other cross-section of the unwound anti-resonant hollow core fiber until a set of capillaries or space between two sets of capillaries is detected and alignment of respectively the two optical detectors or the space so that each of the two optical detectors receives an equal amount of incident optical power within a temporal region representative of the set of capillaries.

Example 11 includes the program product of any of Examples 9-10, wherein the process further comprises receiving at least one of: the desired azimuthal orientation of the cross-section of the unwound anti-resonant hollow core fiber with respect to the bend plane and a desired rate of azimuthal rotation of the cross-section of the unwound anti-resonant hollow core fiber with respect to the length of the unwound anti-resonant hollow core fiber.

Example 12 includes the program product of any of Examples 9-11, wherein the power or energy levels comprise power or energy levels with respect to frequency spectrum.

Example 13 includes the program product of any of Examples 9-12 wherein determining the azimuthal correction data comprises: identifying optical path delay regions of interest in the unwound anti-resonant hollow core fiber; receiving two sets of data each of which includes detected optical power with respect to wavelength, frequency, or interferometric delay, wherein each pair of sets of data is received from the two optical detectors; transforming each set of data including detected optical power into a set of data including optical path delay data; and for each set of optical path delay data, identifying the maximum intensity, or the time delay at which the maximum intensity occurs, within an optical path delay region of interest in a corresponding set of optical path delay data is identified; determining a gradient of respectively maximum intensities or time delays; and determining azimuthal correction data configured to cause the gradient to be zero at an azimuthal angular center between the two optical detectors.

Example 14 includes an apparatus for azimuthally aligning a cross-section of unwound anti-resonant hollow core fiber when winding such unwound anti-resonant hollow core fiber into a coil, the apparatus comprising: a source of the unwound anti-resonant hollow core fiber, wherein the unwound anti-resonant hollow core fiber comprises at least one set of anti-resonant capillary elements and a jacket, wherein the at least one set of anti-resonant capillary elements is affixed to an interior sidewall of the jacket; a sensor configured to determine an azimuthal rotation offset of the unwound anti-resonant hollow core fiber, wherein the sensor comprises at least one optical source and at least two optical detectors, wherein each optical source is configured to generate an optical signal, wherein each optical signal is configured to be incident on an exterior surface of a jacket of the unwound anti-resonant hollow core fiber, wherein each detector is separated from another detector by an azimuthal offset angle with respect to a cross-section of the unwound anti-resonant hollow core fiber, wherein the cross-section is perpendicular to a length of the unwound anti-resonant hollow core fiber, wherein each detector is configured to measure power or energy levels of portions, of the optical signal, reflected from and/or traversing around a circumference of at least one capillary of the unwound anti-resonant hollow core fiber; processing circuitry communicatively coupled to the sensor and configured to receive data about the power or the energy levels measured by each detector; wherein the processing circuitry is further configured to use (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identify, for each of such data received from an optical detector, a maximum intensity with respect to optical path delay or a time delay at which the maximum intensity occurs with respect to the optical path delay and then using each maximum intensity or time delay, (y) determine azimuthal correction data, wherein the cross-section is perpendicular to a length of the unwound anti-resonant hollow core fiber; a mandrel comprising a winding axis and configured to wind, into the coil, the unwound anti-resonant hollow core fiber dispensed from the source of the unwound anti-resonant hollow core fiber; and a rotation mechanism comprising a motor and configured, responsive to the azimuthal correction data, to azimuthally rotate the cross-section or another cross-section of the unwound anti-resonant hollow core fiber to control azimuthal rotation of the unwound anti-resonant hollow core fiber, relative to a bend plane of the unwound anti-resonant hollow core fiber, as the coil is wound on the mandrel, wherein the bend plane is orthogonal to the cross-section of the unwound anti-resonant hollow core fiber and is orthogonal to the winding axis of the mandrel.

Example 15 includes the apparatus of Example 14, wherein azimuthally rotate the cross-section or the other cross-section comprises causing a continuous azimuthal rotation of the cross-section or the other cross-section of the unwound anti-resonant hollow core fiber or a periodically varying azimuthal rotation of the cross-section or the other cross-section of the unwound anti-resonant hollow core fiber.

Example 16 includes the apparatus of any of Examples 14-15, wherein the processing circuitry is further configured to receive at least one of: the desired azimuthal orientation of the cross-section of the unwound anti-resonant hollow core fiber with respect to the bend plane and a desired rate of azimuthal rotation of the cross-section of the anti-resonant hollow core fiber with respect to the length of the unwound anti-resonant hollow core fiber.

Example 17 includes the apparatus of any of Examples 14-16, wherein the optical signal comprises white light, near infrared light, or a spectrum ranging from infrared light to ultraviolet light, or another optical spectrum.

Example 18 includes the apparatus of any of Examples 14-17, wherein measure the power or energy levels comprises measuring the power or energy levels with respect to frequency spectrum.

Example 19 includes the apparatus of any of Examples 14-18, wherein determine the azimuthal correction data comprises: identify optical path delay regions of interest in the unwound anti-resonant hollow core fiber; receive two sets of data each of which includes detected optical power with respect to wavelength, frequency, or interferometric delay, wherein each pair of sets of data is received from the two optical detectors; transform each set of data including detected optical power into a set of data including optical path delay data; and for each set of optical path delay data, identify the maximum intensity, or the time delay at which the maximum intensity occurs, within an optical path delay region of interest in a corresponding set of optical path delay data is identified; determine a gradient of respectively maximum intensities or time delays; and determine azimuthal correction data configured to cause the gradient to be zero at an azimuthal angular center between two optical detectors.

Example 20 includes the apparatus of any of Examples 14-19, wherein control the azimuthal rotation of the cross-section or another cross-section of the unwound anti-resonant hollow core fiber comprises diminishing azimuthal rotations of cross-sections of the unwound anti-resonant hollow core fiber.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of operating a system for azimuthally aligning a hollow core optical fiber being wound around a winding axis into a coil, the method comprising:
   projecting an optical signal on an outer surface of a jacket of an unwound anti-resonant hollow core fiber;
   measuring, at each of two optical detectors, power or energy levels of portions, of the optical signal, reflected from and/or traversing around a circumference of at least one capillary of the unwound anti-resonant hollow core fiber, wherein the two optical detectors are separated from one another by an azimuthal offset angle with respect to a cross-section of the unwound anti-resonant hollow core fiber;
   receiving, from each optical detector, data about the measured power or energy levels;
   using (a) the data about the measured power or energy levels received from each optical detector and (b) at least one of (i) a desired azimuthal orientation of the cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber;
   using the azimuthal correction data, adjusting an azimuthal alignment of the cross-section or another cross-section of the unwound anti-resonant hollow core fiber with respect to the bend plane; and
   winding the coil of the optical fiber using the unwound anti-resonant hollow core fiber whose azimuthal alignment has been adjusted.

2. The method of claim 1, wherein adjusting the azimuthal alignment of the cross-section or another cross-section of the unwound anti-resonant hollow core fiber comprises diminishing azimuthal rotations of cross-sections of the unwound anti-resonant hollow core fiber.

3. The method of claim 1, wherein adjusting the azimuthal alignment of the cross-section or the other cross-section comprises causing a continuous azimuthal rotation of the cross-section or the other cross-section of the unwound anti-resonant hollow core fiber or a periodically varying azimuthal rotation of the cross-section or the other cross-section of the unwound anti-resonant hollow core fiber.

4. The method of claim 1, further comprising calibrating the system by azimuthally rotating the cross-section or the other cross-section of the unwound anti-resonant hollow core fiber until a set of capillaries or space between two sets of capillaries is detected and aligning respectively the two optical detectors or the space so that each of the two optical detectors receives an equal amount of incident optical power within a temporal region representative of the set of capillaries.

5. The method of claim 1, further comprising receiving at least one of: the desired azimuthal orientation of the cross-section of the unwound anti-resonant hollow core fiber with respect to the bend plane and a desired rate of azimuthal rotation of the cross-section of the anti-resonant hollow core optical fiber with respect to the length of the unwound anti-resonant hollow core fiber.

6. The method of claim 1, wherein the optical signal comprises white light, near infrared light, or a spectrum ranging from infrared light to ultraviolet light, or another optical spectrum.

7. The method of claim 1, wherein measuring the power or energy levels comprises measuring the power or energy levels with respect to frequency spectrum.

8. The method of claim 1, wherein determining the azimuthal correction data comprises:
  identifying optical path delay regions of interest in the unwound anti-resonant hollow core fiber;
  receiving at least two sets of data each of which includes detected optical power with respect to wavelength, frequency, or interferometric delay, wherein each pair of sets of data is received from each of the two optical detectors;
  transforming each set of data including detected optical power into a set of data including optical path delay data; and
  for each set of optical path delay data, identifying the maximum intensity, or the time delay at which the maximum intensity occurs, within an optical path delay region of interest in a corresponding set of optical path delay data is identified;
  determining a gradient of respectively maximum intensities or time delays; and
  determining azimuthal correction data configured to cause the gradient to be zero at an azimuthal angular center between the two optical detectors.

9. A program product comprising a non-transitory processor readable medium on which program instructions are embodied, wherein the program instructions are configured, when executed by at least one programmable processor, to cause the at least one programmable processor to execute a process to cause a hollow core optical fiber to be azimuthally aligned when being wound around a winding axis into a coil, the process comprising:
  receiving, from each of two optical detectors, data about power or energy levels measured at each of the two optical detectors, wherein the two optical detectors are separated from one another by an azimuthal offset angle with respect to a cross-section of an unwound anti-resonant hollow core fiber;
  using (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identifying, for each of such data received from an optical detector, a maximum intensity with respect to optical path delay or a time delay at which the maximum intensity occurs with respect to the optical path delay and then using each maximum intensity or time delay, (y) determining azimuthal correction data, wherein the cross-section is perpendicular to a length of the unwound anti-resonant hollow core fiber, wherein the bend plane is orthogonal both to the winding axis and to the cross-section of the unwound anti-resonant hollow core fiber; and
  transmitting the azimuthal correction data which is configured to be used to adjust an azimuthal alignment of the cross-section or another cross-section of the unwound anti-resonant hollow core fiber with respect to the bend plane as a coil of optical fiber is wound using the unwound anti-resonant hollow core fiber whose azimuthal alignment has been adjusted.

10. The program product of claim 9, wherein the process further comprises causing azimuthal rotation of the cross-section or the other cross-section of the unwound anti-resonant hollow core fiber until a set of capillaries or space between two sets of capillaries is detected and alignment of respectively the two optical detectors or the space so that each of the two optical detectors receives an equal amount of incident optical power within a temporal region representative of the set of capillaries.

11. The program product of claim 9, wherein the process further comprises receiving at least one of: the desired azimuthal orientation of the cross-section of the unwound anti-resonant hollow core fiber with respect to the bend plane and a desired rate of azimuthal rotation of the cross-section of the unwound anti-resonant hollow core fiber with respect to the length of the unwound anti-resonant hollow core fiber.

12. The program product of claim 9, wherein the power or energy levels comprise power or energy levels with respect to frequency spectrum.

13. The program product of claim 9 wherein determining the azimuthal correction data comprises:
  identifying optical path delay regions of interest in the unwound anti-resonant hollow core fiber;
  receiving two sets of data each of which includes detected optical power with respect to wavelength, frequency, or interferometric delay, wherein each pair of sets of data is received from the two optical detectors;
  transforming each set of data including detected optical power into a set of data including optical path delay data; and
  for each set of optical path delay data, identifying the maximum intensity, or the time delay at which the maximum intensity occurs, within an optical path delay region of interest in a corresponding set of optical path delay data is identified;
  determining a gradient of respectively maximum intensities or time delays; and
  determining azimuthal correction data configured to cause the gradient to be zero at an azimuthal angular center between the two optical detectors.

14. An apparatus for azimuthally aligning a cross-section of unwound anti-resonant hollow core fiber when winding such unwound anti-resonant hollow core fiber into a coil, the apparatus comprising:
  a source of the unwound anti-resonant hollow core fiber, wherein the unwound anti-resonant hollow core fiber comprises at least one set of anti-resonant capillary elements and a jacket, wherein the at least one set of anti-resonant capillary elements is affixed to an interior sidewall of the jacket;
  a sensor configured to determine an azimuthal rotation offset of the unwound anti-resonant hollow core fiber, wherein the sensor comprises at least one optical source and at least two optical detectors, wherein each optical source is configured to generate an optical signal, wherein each optical signal is configured to be incident on an exterior surface of a jacket of the unwound anti-resonant hollow core fiber, wherein each detector is separated from another detector by an azimuthal offset angle with respect to a cross-section of the unwound anti-resonant hollow core fiber, wherein the cross-section is perpendicular to a length of the unwound anti-resonant hollow core fiber, wherein each detector is configured to measure power or energy levels of portions, of the optical signal, reflected from and/or traversing around a circumference of at least one capillary of the unwound anti-resonant hollow core fiber;

processing circuitry communicatively coupled to the sensor and configured to receive data about the power or the energy levels measured by each detector;

wherein the processing circuitry is further configured to use (a) the data about the measured power or energy levels received from each optical detector and (b) at least one of (i) a desired azimuthal orientation of a cross-section with respect to a bend plane of the unwound anti-resonant hollow core fiber and (ii) a desired rate of azimuthal rotation with respect to a length of the unwound anti-resonant hollow core fiber, (x) identify, for each of such data received from an optical detector, a maximum intensity with respect to optical path delay or a time delay at which the maximum intensity occurs with respect to the optical path delay and then using each maximum intensity or time delay, (y) determine azimuthal correction data, wherein the cross-section is perpendicular to a length of the unwound anti-resonant hollow core fiber;

a mandrel comprising a winding axis and configured to wind, into the coil, the unwound anti-resonant hollow core fiber dispensed from the source of the unwound anti-resonant hollow core fiber; and a rotation mechanism comprising a motor and configured, responsive to the azimuthal correction data, to azimuthally rotate the cross-section or another cross-section of the unwound anti-resonant hollow core fiber to control azimuthal rotation of the unwound anti-resonant hollow core fiber, relative to a bend plane of the unwound anti-resonant hollow core fiber, as the coil is wound on the mandrel, wherein the bend plane is orthogonal to the cross-section of the unwound anti-resonant hollow core fiber and is orthogonal to the winding axis of the mandrel.

15. The apparatus of claim 14, wherein azimuthally rotate the cross-section or the other cross-section comprises causing a continuous azimuthal rotation of the cross-section or the other cross-section of the unwound anti-resonant hollow core fiber or a periodically varying azimuthal rotation of the cross-section or the other cross-section of the unwound anti-resonant hollow core fiber.

16. The apparatus of claim 14, wherein the processing circuitry is further configured to receive at least one of: the desired azimuthal orientation of the cross-section of the unwound anti-resonant hollow core fiber with respect to the bend plane and a desired rate of azimuthal rotation of the cross-section of the anti-resonant hollow core fiber with respect to the length of the unwound anti-resonant hollow core fiber.

17. The apparatus of claim 14, wherein the optical signal comprises white light, near infrared light, or a spectrum ranging from infrared light to ultraviolet light, or another optical spectrum.

18. The apparatus of claim 14, wherein measure the power or energy levels comprises measuring the power or energy levels with respect to frequency spectrum.

19. The apparatus of claim 14, wherein determine the azimuthal correction data comprises:

identify optical path delay regions of interest in the unwound anti-resonant hollow core fiber;

receive two sets of data each of which includes detected optical power with respect to wavelength, frequency, or interferometric delay, wherein each pair of sets of data is received from the two optical detectors;

transform each set of data including detected optical power into a set of data including optical path delay data; and for each set of optical path delay data, identify the maximum intensity, or the time delay at which the maximum intensity occurs, within an optical path delay region of interest in a corresponding set of optical path delay data is identified;

determine a gradient of respectively maximum intensities or time delays; and determine azimuthal correction data configured to cause the gradient to be zero at an azimuthal angular center between two optical detectors.

20. The apparatus of claim 14, wherein control the azimuthal rotation of the cross-section or another cross-section of the unwound anti-resonant hollow core fiber comprises diminishing azimuthal rotations of cross-sections of the unwound anti-resonant hollow core fiber.

* * * * *